(12) United States Patent
Wolter

(10) Patent No.: US 6,554,227 B2
(45) Date of Patent: *Apr. 29, 2003

(54) FLIGHT APPARATUS

(76) Inventor: Dietmar Wolter, c/o Berufsgenossenschaftliches Unfallkrankenhaus Bergedorfer Strasse 10, D-21033 Hamburg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/510,026

(22) Filed: Feb. 22, 2000

(65) Prior Publication Data
US 2002/0043587 A1 Apr. 18, 2002

(30) Foreign Application Priority Data
Mar. 1, 1999 (DE) .......................... 199 08 861

(51) Int. Cl.⁷ ................................ B64D 25/12
(52) U.S. Cl. ...................................... 244/140
(58) Field of Search ..................... 244/138 R, 139, 244/140, 141, 147

(56) References Cited

U.S. PATENT DOCUMENTS

| 2,075,042 A | * | 3/1937 | Knerr ....................... 244/118.2 |
| 2,388,380 A | * | 11/1945 | Bathurst ................... 244/118.2 |
| 2,448,862 A | * | 9/1948 | Conklin .................... 244/118.2 |
| 3,067,973 A | * | 12/1962 | Halsey et al. ................ 244/140 |
| 3,377,037 A | * | 4/1968 | Stewart ....................... 244/140 |
| 3,881,671 A | * | 5/1975 | Bouchnik ..................... 244/140 |
| 4,409,658 A | * | 10/1983 | Beusse .................... 244/168 R |
| 4,426,050 A | * | 1/1984 | Long .......................... 244/140 |
| 5,031,860 A | * | 7/1991 | Ruiz et al. ................... 244/140 |
| 5,356,097 A | * | 10/1994 | Chalupa .................. 244/118.2 |
| 5,568,903 A | | 10/1996 | Pena et al. ................... 244/140 |
| 5,681,010 A | * | 10/1997 | Jensen ......................... 244/49 |
| 5,899,415 A | * | 5/1999 | Conway et al. .......... 244/168 R |
| 5,992,794 A | * | 11/1999 | Rotman et al. .......... 244/168 R |

* cited by examiner

Primary Examiner—Galen L. Barefoot
(74) Attorney, Agent, or Firm—Vidas, Arrett & Steinkraus, P.A.

(57) ABSTRACT

A apparatus with releasably fastened transport units for carrying a useful load, such as persons or freight.

28 Claims, 2 Drawing Sheets

FLIGHT APPARATUS

BACKGROUND OF THE INVENTION

1. Field of the Invention

The invention relates to a flight apparatus which is envisaged for transporting a useful load, i.e. persons or freight. Preferably the flight apparatus is an aircraft.

2. Description of the Related Art

With already known air transport systems a certain rationalization is effected in that already container-like containers are used in order to optimize the loading and unloading of freight. The embarking and disembarking of persons is in contrast effected in a relatively complicated clearance method via telescopic or traversable steps.

It has been shown that the rescue of passengers in hopeless flying situations at a great or middle altitude is as a rule no longer possible. One of the causes lies in the rigid connection between the passenger cabin and the aircraft.

Although there are considerable efforts to improve the inner safety of aircraft, for example by way of fire protection systems, seatbelts, guiding light systems, slides, and other things. It is however remarkable that inspite of the highly developed transport technology few solutions have been suggested in order to free persons from a critical situation.

One of the causes is certainly to be seen in the fact that the flight safety on account of the high technical standard must be regarded as good. It is generally known that aircraft in comparison to the number of kilometers travelled is the safest means of transport.

Nevertheless time and again there occur great aircraft catastrophes with a complete loss of life. Since in the future large-spaced aircraft will assume an ever greater share of volume of the passenger transport, it would indeed be meaningful to develop rescue possibilities. U.S. Pat No. 5,568,903 already describes a safety aircraft in which a carrier part carries a saddle part with a passenger cabin. Passengers and cabin crew embark and disembark conventionally. The saddle part is however in an emergency situation releasable from the carrier part in order to fall to the ground on parachutes. This suggestion is difficult and complicated in its execution due to the size and the weight of the saddle part.

Proceeding from this it is the object of the invention to provide a flight apparatus which economizes the transport of people and freight and creates the possibility of saving people in hopeless situations.

SUMMARY OF THE INVENTION

The flight apparatus according to the invention has releasably fastened transport units for the useful load. The transport units may serve as cabins for persons and/or storage spaces for freight and may comprise suitable equipment. Preferably the transport units may form a part of the outer skin of the flight apparatus which may be formed mainly essentially without joints. The releasable fastening of the transport units may in particular be effected on the fuselage of the flight apparatus, for example on its outer side. With this the transport units may essentially be tubular and on the end-face side may be connected to one another and/or to the flight apparatus and/or on the circumferential side to the flight apparatus. The connections may be completely or party effected via quick couplings. Furthermore they may be designed pressure tight, in particular at the end-face sides of the transport units. The transport units may furthermore comprise parachutes which with a decoupling of the transport units from the flight apparatus in an emergency may be released.

The flight apparatus according to the invention thus comprises exchangeable transport units for the transport of persons and cargo which may be applied similar to containers. These transport units may according to necessity be varied in their volume such that they may be made available in standardized dimensions and temporarily fixed to the flight apparatus. A further advantage of this transport system is that it offers the possibility in an emergency of releasing the transport units in particular for the passengers from the actual flight apparatus in order then with the help of parachutes and where appropriate auxiliary means to let these glide safely to the earth. This air transport system for persons and freight is very variable and may be set to the respective requirements. Furthermore it permits a considerable improvement for the safety of persons in air travel.

Preferably the flight apparatus according to the invention is an aircraft. The transport units for persons and freight may be arranged in the fuselage of the machine in particular below the wings. Preferably with this aircraft types are to be applied with which the wings are mounted in the upper third of the fuselage. The transport units for persons as well as the transport units for freight may be standardized, container-like constructions which as a whole may form a jointless aircraft fuselage. These fuselage parts may by way of quick couplings be easily brought into position or removed. In dependence on the number of the persons or freight to be transported for the respective flight more person transport units or more freight transport units may be applied.

With this it is quite conceivable that the person transport units may be brought to the flight apparatus already with the passengers, and here coupled. This is likewise possible for the freight transport units.

By way of this organizational and design manner there results an economical advantage. It is specifically not rare on account of a low passenger volume that half-empty aircraft fly and the space present may not be used for freight.

With a preferred formation the individual transport units are formed such that they as a whole result in an aircraft fuselage meeting all aerodynamic demands. With this the individual transport units may have a size and a weight which allows them to be brought safely to earth with the help of load parachutes. With the decoupling of these transport units from the actual flight apparatus a secure opening of the parachutes must be ensured.

According to one formation for a rapid opening the parachutes for the transport units with the decoupling of these from the actual flight apparatus may be directly pulled out of a covering. Furthermore all parachutes may be designed controllable. There may be present wing and control elements which may be folded out and which on falling to the earth permit a certain control ability. Also inflatable outer parts in particular as wing or control elements may be present in order to achieve a weight saving. According to one formation there exists the possibility, with the help of navigation systems and a certain controllability of the transport units to find suitable locations for the landing in a limited area.

In order to simplify the actual landing procedure and to further minimize the danger to the occupants a further formation envisages the softening of the impact by way of airbags. The ignition of the airbags may with this for example be carried out automatically by a distance radar or by way of another suitable system.

According to a further formation the landing speed of the transport units may be reduced by braking rockets. Exit openings on the ceiling may be present as a precaution.

The transport units for the passengers may furthermore be designed such that connection doors between the individual transport units may be hermetically closed in order thus to prevent excess pressure or vacuum problems from occurring. Furthermore these transport units may be watertight so that with an emergency landing in water the floatability of the transport unit over a longer period of time is ensured.

For water landings, furthermore in the transport units there may be present floodable chambers so that the transport units float in a more stable manner.

For an adequate supply of oxygen suitably supply means may be present in person transport units. In this context one may also provide for the removal of $CO_2$ from the air space.

A further formation envisages that by way of known tracking systems an easy locating of the transport units is possible or by way of suitable communication systems (e.g. via satellite) the occupants may get into contact with civilization.

Of a particular importance is the possibility of a rapid and secure coupling of the transport units to the actual flight apparatus. In the same manner this applies to the decoupling in particular in emergency situations. Here for example purely mechanical connections are conceived but also connections which are created with the help of hydraulics and rails or rail elements. Also supporting principles as for example are applied in bridge building (wedge shape) may be applied. With this where appropriate one may fall back on coupling and decoupling techniques which are for example present with the transport of containers in shipping. Suitable coupling techniques may also be found in space travel, for example in rocket technology which provides for the coupling and separation of the individual rocket stages.

The loads occurring between the transport units or between these and the flight apparatus must here be incorporated into the design principles. With this the connection at several points of the contact regions may be effected so that high changing loads such as for example are to be expected with turbulence do not lead to a system failure.

With pure freight vehicles suitable transport units may be set up for the flight personnel in order to increase their safety.

The possible higher weight of this air transport system and the thus higher development and transport costs may at least be partly compensated for by a higher economicability when the passenger and freight parts may be adapted at a short notice to the respective requirements.

BRIEF DESCRIPTION OF THE DRAWINGS

One embodiment example of the invention is described in more detail in the following description by way of the accompanying drawing. In the drawings there are shown.

DESCRIPTION OF THE PREFERRED EMBODIMENTS

Figure 1:
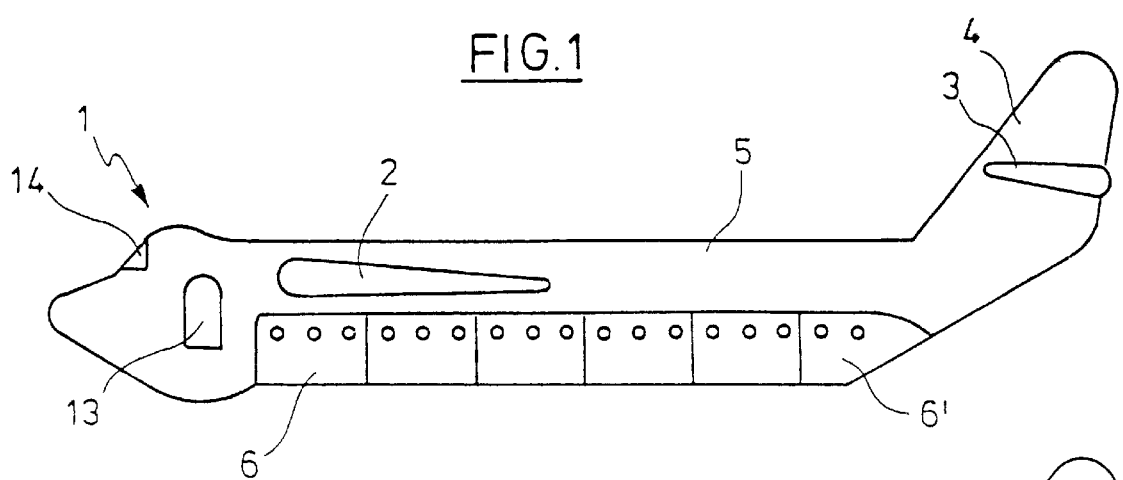
FIG. 1 an aircraft with releasably fastened transport units in a rough schematic lateral view.

The aircraft 1 according to FIG. 1 comprises the main constructional groups, airframe, motive power unit (not shown) and furnishings (not shown). To the airframe there belongs the constructional groups of the wing unit with the wings 2, 3, the tail plane 4 and fuselage 5. The fuselage 5 of the flight apparatus accommodates the aircrew, passengers, payloads, equipment, fuel and connects the wing unit to the tail plane as well as to the landing gear. The fuselage with passenger aircraft is mostly formed as a pressurized fuselage (pressurized cabin) and with freight aircraft has large loading gates at the nose or tail.

Figure 3:
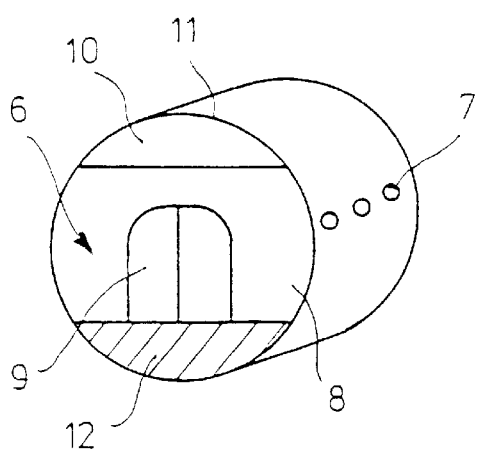
FIG. 3 *a* transport unit in an enlarged, rough schematic perspective view.

On the lower side of the fuselage 5 there are releasably fastened a multitude of transport units 6. As is better viewable from FIG. 3 each transport unit 6 has an essentially cylindrical shape with rows of windows 7 on the casing circumference. The end-face sides are closed by way of bulkhead walls 8 in which there are arranged doors which are closable in a pressure-tight and water-tight manner. In an upper chamber 10 under a covering 11 there are accommodated parachutes. A lower chamber 12 is floodable in order to give the transport unit 6 and improved floating stability.

The transport units 6 are by way of quick couplings which are not shown, fixed to the fuselage. They are connected to one another and to the fuselage 5 in a pressure-tight manner. As a results of this in normal flight operation all doors 9 may be opened so that the transport units 6 may be passed through after one another. From the frontmost transport unit 6 there may be a passage to the door 13 and to the cockpit 14. The rear transport unit 6' is in this example specially formed since at the same time it is a part of the aircraft tail. It is only provided at the front side with a bulkhead wall 8 and a door 9 and at the rear is completely closed.

Figure 2:
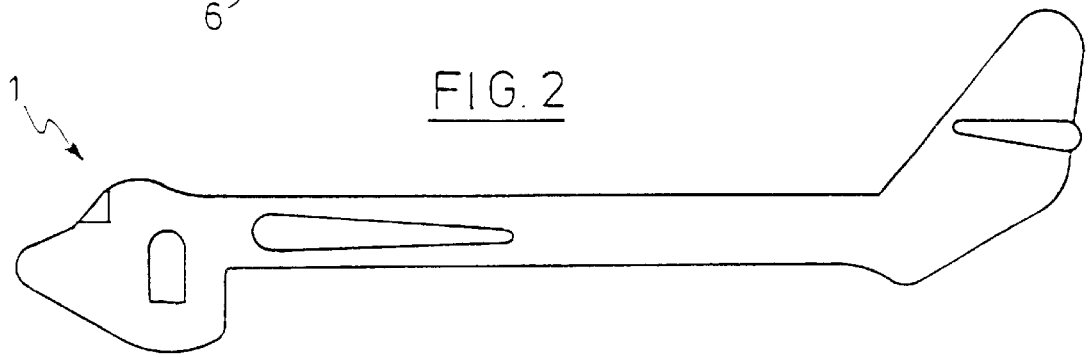
FIG. 2 the same aircraft without the transport unit in a rough schematic lateral view.

According to FIG. 2 all transport units 6 are released from the flight apparatus 1. This may be the case between flights, for example when the aircraft is overhauled so that the transport units 6 may be supplied for other applications. Also it is possible to convey the passengers or freight in transport units 6 to the aircraft and to equip this on the airfield 6 with the transport units 6. Finally it is possible to eject the transport units in emergency situations so that these may glide safely to the ground on parachutes.

Figure 4:
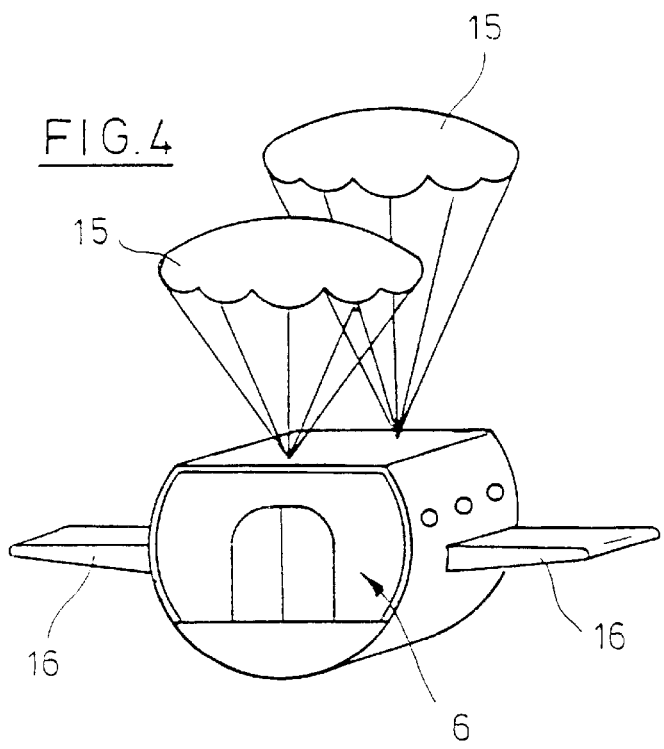
FIG. 4 the same transport unit after the setting free of the parachutes in the same, rough schematic perspective.

This situation is shown for a transport unit 6 in FIG. 4. It is to be understood that before ejecting the transport unit 6 the doors 9 are hermetically closed, also with regard to ditching in the sea. After the separation from the flight apparatus 1 the covering 11 is blown off and the parachutes open out in order to safely bring the transport unit 6 to the ground. Wings or control elements (e.g. control flaps) which may be folded out permit in a limited manner landing handicaps to be avoided or for landing places to be steered to.

Figure 5:
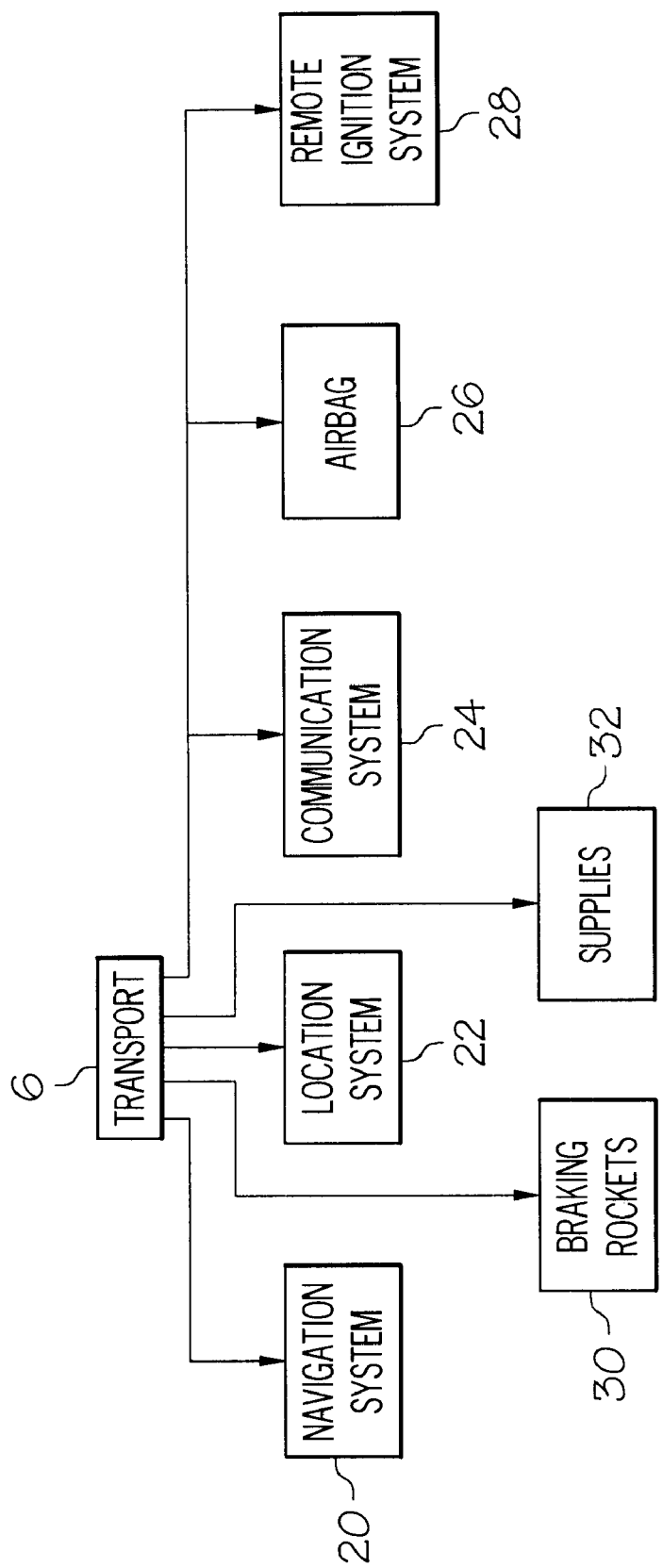
FIG. 5 a block diagram showing the optional components which may be included in the transport units.

FIG. 5 shows the optional components which may be included with the transport 6, including a navigation system 20, a location system 22, a communication system 24, airbag 26, a remote ignition system 28, braking rockets 30, and supplies 32.

This completes the description of the preferred and alternate embodiments of the invention. Those skilled in the art may recognize other equivalents to the specific embodiment described herein which equivalents are intended to be encompassed by the claims attached hereto.

What is claimed is:

1. A flight apparatus with releasably fastened transport units (6), each transport unit for carrying a useful load, each transport unit capable of carrying either passengers or cargo, each transport unit further comprising cabins and wherein each transport unit is releasably fastened on the underside of a fuselage (5) of the flight apparatus (1), each transport further including at least one parachute (15), the at least one parachute being attached to the transport unit such that after the transport unit is decoupled from the fuselage the at least one parachute can be set free, whereby the releasably fastened transport units can be used for rescue purposes during flight and for logistic purposes when loading.

2. A flight apparatus according to claim 1, in which the releasably fastened transport units (6) on the circumference comprise exit holes.

3. A flight apparatus according to claim 1, in which the releasably fastened transport units (6) further comprise storage space for freight.

4. A flight apparatus according to claim 1, in which the releasably fastened transport units (6) have the same dimensions.

5. A flight apparatus according to claim 1, in which the releasably fastened transport units (6) have varied dimensions.

6. A flight apparatus according to claim 1, in which the releasably fastened transport units (6) form part of an outer skin of the flight apparatus.

7. A flight apparatus according to claim 6, in which the releasably fastened transport units (6) form a part of the outer skin, said part being essentially jointless.

8. A flight apparatus according to claim 1, in which the releasably fastened transport units (6) are water-tight or closable in a water-tight manner.

9. A flight apparatus according to claim 1, in which the releasably fastened transport units (6) have supply means which can be coupled to the flight apparatus (1).

10. A flight apparatus according to claim 1, in which the releasably fastened transport units (6) are fastened via quick couplings.

11. A flight apparatus according to claim 1, in which the releasably fastened transport units (6) form an aerodynamically shaped section of the fuselage (5).

12. A flight apparatus according to claim 1, in which the releasably fastened transport units (6) are essentially tubular and on an end-face side are connectable to one another.

13. A flight apparatus according to claim 1, in which the releasably fastened transport units (6) of an end-face side are closable and/or closed.

14. A flight apparatus according to claim 13, in which the releasably fastened transport units (6) on the end-face side comprise bulkhead walls (8) and/or doors (9).

15. A flight apparatus according to claim 1, in which the releasably fastened transport units (6) are connected pressure-tightly to the flight apparatus (1) and/or to one another.

16. A flight apparatus according to claim 1, which can be equipped with a varied number of transport units (6).

17. A flight apparatus according to claim 1, in which at least one transport unit (6') closed on an end side is present for closing a series of transport units.

18. A flight apparatus according to claim 1, in which the releasably fastened transport units (6) have their own oxygen supply and/or an oxygen supply which can be coupled to the flight apparatus and/or have a $CO_2$ disposal.

19. A flight apparatus according to claim 1, in which the flight apparatus is an aircraft (1).

20. A flight apparatus according to claim 1, in which the parachutes can automatically be set free.

21. A flight apparatus according to claim 1, in which the parachutes (15) are controllable.

22. A flight apparatus according to claim 1, in which the releasably fastened transport units (6) have wings (16) which can be folded out and/or control elements.

23. A flight apparatus according to 22, in which the wings (16) and/or control elements are or comprise inflatable parts.

24. A flight apparatus according to claim 1, in which the releasably fastened transport units (6) have navigation systems and/or location systems and/or communication.

25. A flight apparatus according to claim 1, in which the releasably fastened transport units (6) have integrated airbags for damping an impact.

26. A flight apparatus according to claim 25, in which the ignition of the airbags is effected automatically with ground approach by way of parachute (15).

27. A flight apparatus according to claim 26, in which the ignition of the airbags is controlled by a distance radar.

28. A flight apparatus according to claim 1, in which the releasably fastened transport units (6) have integrated braking rockets for reducing the sinking speed with ground approach by way of parachute (15).

* * * * *